United States Patent
Kurtz et al.

(10) Patent No.: US 6,689,669 B2
(45) Date of Patent: Feb. 10, 2004

(54) HIGH TEMPERATURE SENSORS UTILIZING DOPING CONTROLLED, DIELECTRICALLY ISOLATED BETA SILICON CARBIDE (SIC) SENSING ELEMENTS ON A SPECIFICALLY SELECTED HIGH TEMPERATURE FORCE COLLECTING MEMBRANE

(75) Inventors: Anthony D. Kurtz, Ridgewood, NJ (US); Alexander A. Ned, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 44 days.

(21) Appl. No.: 10/008,313

(22) Filed: Nov. 3, 2001

(65) Prior Publication Data

US 2003/0087481 A1 May 8, 2003

(51) Int. Cl.[7] ................................................ H01L 21/30
(52) U.S. Cl. ................ 438/459; 438/458; 438/931; 438/406; 438/285; 438/977
(58) Field of Search ................................. 438/149, 295, 438/404, 406, 458, 459, 931, FOR 262, 285, 977; 257/E27.7, E21.054, E21.065, E29.02, E21.561, E21.567, E21.568, E21.605; 148/DIG. 148

(56) References Cited

U.S. PATENT DOCUMENTS

| | | | |
|---|---|---|---|
| 4,983,538 A | * 1/1991 | Gotou | 438/459 |
| 5,165,283 A | 11/1992 | Kurtz et al. | 73/727 |
| 5,286,671 A | 2/1994 | Kurtz et al. | 437/64 |
| 6,034,001 A | 3/2000 | Shor et al. | 438/931 |
| 6,058,782 A | 5/2000 | Kurtz et al. | 73/727 |

OTHER PUBLICATIONS

"Structural Characterization of Nanometer SiC Films Grown on Si" published in the Applied Physics Letters 62 (24) Jun. 1993, pp. 3135–3137 by Li, Steckl, et al.

"Epitaxial Growth of 3C–SiC Films on 4 inch Diameter Silicon Wafers by Atmospheric Pressure Chemical Vapor Deposition" published in the Journal of Applied Physics 78 (8) Oct. 1995, pp. 5136–5138 by Zorman, Fleischman, Dewa, Mehregany, et al.

* cited by examiner

Primary Examiner—George Fourson
Assistant Examiner—Julio J. Maldonado
(74) Attorney, Agent, or Firm—Duane Morris LLP

(57) ABSTRACT

Semiconductor devices useful in high temperature sensing applications include a silicon carbide substrate, a silicon dioxide layer, and an outer layer of crystalline doped silicon carbide. The device is a 3C—SiC/SiO$_2$/SiC structure. This structure can be employed to fabricate high temperature devices such as piezoresistive sensors, minority carrier devices and so on. The crystalline doped silicon carbide is dielectrically isolated from the substrate. The devices are formed by processes that include bonding a pattern wafer to a substrate wafer, selective oxidation and removal of undoped silicon, and conversion of doped silicon to crystalline silicon carbide. The level of doping and the crystalline structure of the silicon carbide can be selected according to desired properties for particular applications.

13 Claims, 3 Drawing Sheets

HIGH TEMPERATURE SENSORS UTILIZING DOPING CONTROLLED, DIELECTRICALLY ISOLATED BETA SILICON CARBIDE (SIC) SENSING ELEMENTS ON A SPECIFICALLY SELECTED HIGH TEMPERATURE FORCE COLLECTING MEMBRANE

FIELD OF THE INVENTION

The present invention relates to high temperature sensors and more particularly, to a method which enables the fabrication of a specifically selected single crystal 3C—SiC layer located on, and dielectrically isolated from, an independently selected 6H—SiC substrate or any other type of SiC substrate material.

BACKGROUND OF THE INVENTION

As one will ascertain, pressure transducers capable of operating at high temperatures of at least, for example 600° C. and being physically small are highly desirous in various applications. When temperatures reach levels above 600° C., silicon-sensing networks and silicon force collectors undergo significant plastic deformation rendering the device useless as a pressure transducer. In order to overcome this problem, high temperature transducers employing SiC have been fabricated. For example, see U.S. Pat. No. 5,165,283 to A. D. Kurtz et al. entitled, "High Temperature Transducers and Methods of Fabricating Same Employing SiC" assigned to the assignee herein, Kulite Semiconductor Products, Inc. Also see, for example, U.S. Pat. No. 6,058,782 entitled, "Hermetically Sealed Ultra High Temperature SiC Pressure Transducers and Method for Fabricating the Same" issued to A. D. Kurtz et al. on May 9, 2000 and also assigned to the assignee herein. Thus, there is a desire to fabricate high temperature transducers.

The present invention enables the fabrication of a specifically selected (both the type and the doping) single crystal 3C—SiC layer located on, and dielectrically isolated from an independently selected 6H—SiC substrate, or any other SiC substrate material.

The device thus produced using this approach will have the benefit of having an excellent single crystal 3C—SiC, on an insulator layer with specified doping for piezoresistive sensing while having an independently selected substrate material like 6H—SiC or 4H—SiC used for producing the deflecting membrane or other substrate.

SUMMARY OF THE INVENTION

Semiconductor devices useful in high temperature sensing applications include a silicon carbide substrate, a silicon dioxide layer, and an outer layer of crystalline doped silicon carbide. The device is a 3C—SiC/SiO$_2$/SiC structure. This structure can be employed to fabricate high temperature devices such as piezoresistive sensors, minority carrier devices and so on. The crystalline doped silicon carbide is dielectrically isolated from the substrate. The devices are formed by processes that include bonding a pattern wafer to a substrate wafer, selective oxidation and removal of undoped silicon, and conversion of doped silicon to crystalline silicon carbide. The level of doping and the crystalline structure of the silicon carbide can be selected according to desired properties for particular applications.

DETAILED DESCRIPTION OF THE DRAWINGS

The invention will be described in a series of Figures, which are basically designated as 1 through 14 and the fabrication technique will be described.

Figure 1:
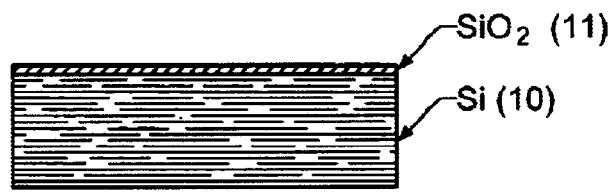
FIG. 1 is a cross sectional view of the sacrificial wafer used according to this invention.

Referring to FIG. 1, there is shown what is referred to as a sacrificial wafer 10. The sacrificial wafer 10 is fabricated from silicon and has grown or otherwise formed on the top surface thereof a layer of silicon dioxide 11. The wafer is referred to as a sacrificial wafer, as will be further understood and clarified in the following description.

Figure 2:
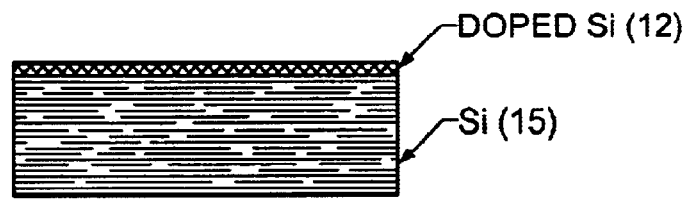
FIG. 2 shows a portion of the wafer of FIG. 1 being doped.

Referring to FIG. 2, there is shown another wafer also of silicon 15 and having a top doped layer 12. The second wafer 15 will be referred to as a pattern wafer and is doped to a specified level necessary for future conversion of the doped silicon into a 3C—SiC layer of targeted resistivity. The wafer shown in FIG. 2 is bonded to the wafer shown in FIG. 1. This is more clearly depicted in FIG. 3.

Figure 3:
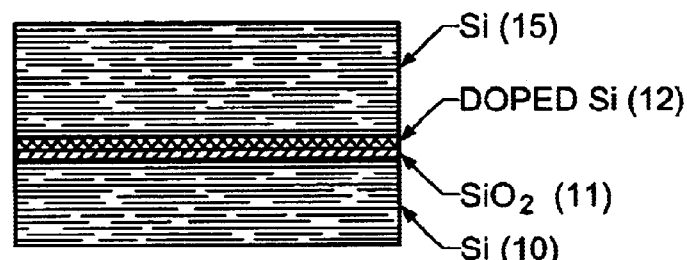
FIG. 3 is a cross sectional view of a bonded pattern wafer and a sacrificial wafer to form a composite wafer according to the method.

In FIG. 3 there is shown the doped silicon wafer 15 having the doped layer 12 bonded to the layer of silicon dioxide 11 associated with the silicon wafer 10. Essentially the top wafer 15 is the pattern wafer of FIG. 2 which is now bonded to the sacrificial wafer of FIG. 1. The bonding takes place using a fusion bonding technique. The use of fusion bonding is well known and reference is made to U.S. Pat. No. 5,286,671 entitled, "Fusion Bonding Technique for Use In Fabricating Semiconductor Devices" issued on Feb. 15, 1994 to A. D. Kurtz et al. and assigned to the assignee herein. The techniques described in that patent are utilized to perform the bonding shown in FIG. 3. Once the bond takes place, a conductivity selected etchant is used to remove the undoped silicon material 15, while leaving only a thin undoped silicon layer 25 over the doped silicon layer 12. This structure is shown in FIG. 4.

Figure 4:
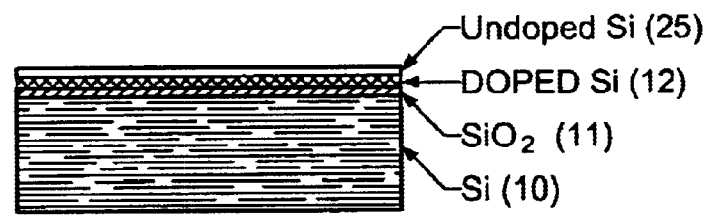
FIG. 4 is a cross sectional view of a pattern composite wafer with undoped silicon removed and a thin layer remaining.

In FIG. 4 one can see that an undoped layer of silicon 25 which basically is the remainder of the wafer 15 shown in FIG. 2 is now bonded or secured to the sacrificial wafer 10 through the silicon dioxide layer 11 which is in contact with the doped silicon layer 12. The thin layer of undoped silicon 25 of FIG. 4 is now converted into a relatively thick oxide layer by thermal oxidation. The technique of thermal oxidation will occur without disturbing the properties of the underlying doped silicon layer 12. This is shown in FIG. 5, where the layer 25 is now converted into the silicon dioxide layer 26 without disturbing the doped silicon layer 12, which of course is secured to the silicon dioxide layer 11 which is secured in turn to the silicon sacrificial wafer 10.

Figure 5:
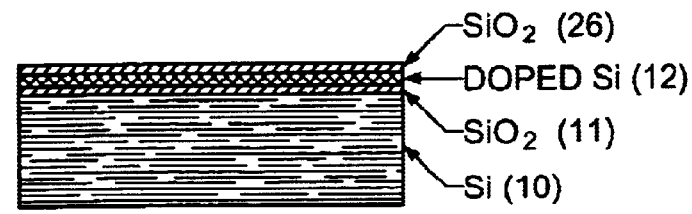
FIG. 5 is a cross sectional view of a pattern wafer with a relatively thick layer of silicon dioxide formed thereon.

As one can ascertain, the wafer as shown in FIG. 5 consists of a pattern wafer, with a relatively thick layer of silicon dioxide 26 obtained by the step of oxidizing the silicon layer 25 of FIG. 4. The relatively thick oxide layer 26, as will be explained, facilitates fusion-bonding process at a subsequent stage.

Figure 6:
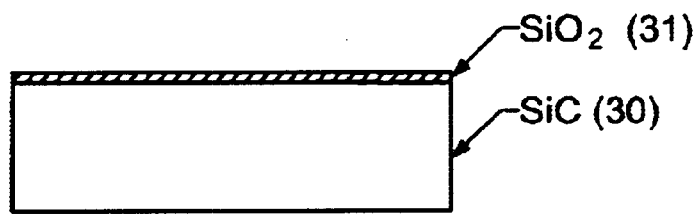
FIG. 6 is a cross sectional view of a substrate wafer according to this invention.
Figure 7:
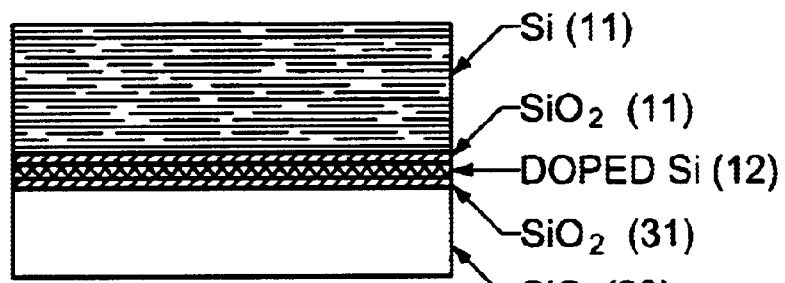
FIG. 7 shows a substrate wafer which is fusion bonded to a pattern wafer according to this invention.

Referring to FIG. 6, there is shown a third wafer which is referred to as a substrate wafer. The substrate wafer consists of a substrate 30 of SiC. The wafer is oxidized using either thermal oxidation or a deposition of oxide to form on top of the SiC wafer 30 a layer of silicon dioxide 31. The formation of such a layer of silicon dioxide is well known. As will be explained in reference to FIG. 7, the substrate wafer shown in FIG. 6 is now fusion bonded to the pattern wafer shown in FIG. 5 to form the composite structure shown in FIG. 7. Thus, the pattern wafer 30 with its relatively thick oxide layer 31 is bonded to the substrate wafer 10 using a fusion bonding technique as described above. This is shown in FIG. 7. The fusion bonding technique basically occurs at a relatively elevated temperature and is a well-known technique and, for example, is described in the above-referenced patent.

Figure 8:
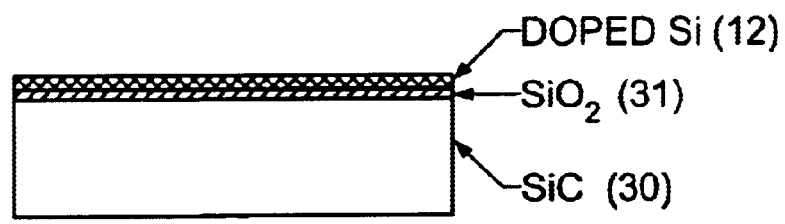
FIG. 8 shows a composite wafer with a doped silicon layer on a top surface according to this invention.

Referring to FIG. 8, there is shown a composite wafer, according to this invention, which has the doped silicon layer 12 exposed and forming the top surface of the composite or laminated device. The doped silicon layer 12 is bonded to the silicon dioxide layer 31, which in turn is bonded to the SiC wafer 30. As seen, the doped silicon layer 12 was formed in FIG. 2 on the silicon pattern wafer 15. In FIG. 8 a conductivity-selected etchant is used to remove all of the undoped silicon material 10 of FIG. 7. That is why in FIG. 1, the silicon wafer 10 was referred to as the sacrificial wafer.

As will be explained in conjunction with FIG. 9, the doped layer of silicon 12 shown in FIG. 8 is converted into a doped layer of 3C crystalline SiC. This can be accomplished using presently existing conversion techniques, which are well known in the art. See for example, an article entitled, "Structural Characterization of Nanometer SiC Films Grown on Si" published in the Applied Physics Letters 62 (24) June 1993, pages 3135 through 3137 by Li, Steckl, et al. Also see an article entitled, "Epitaxial Growth of 3C—SiC Films on 4 inch Diameter Silicon Wafers by Atmospheric Pressure Chemical Vapor Deposition", published in the Journal of Applied Physics 78 (8) October 1995, pages 5136 through 5138 by Zorman, Fleischman, Dewa, Mehregany, et al. In any event, as indicated, these articles teach the formation of 3C crystalline SiC from doped silicon layers.

Figure 9:
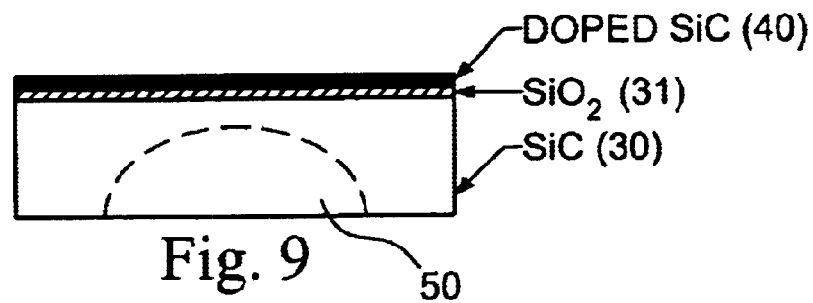
FIG. 9 shows a composite wafer which can be utilized to provide a high temperature sensor structure.

The wafer shown in FIG. 9 has a top layer which is doped SiC 40. The wafer is a laminated 3C—SiC/SiO$_2$/SiC structure. With present conversion techniques, these monocrystalline 3C—SiC layers are obtained by heating silicon substrates at high temperatures (1300° C. to 1360° C.) and providing a C-containing precursor into the mix. One example is to use propane diluted in hydrogen. Once the above semiconductor structure, as shown in FIG. 9, is produced the processing of piezoresistors in the 3C—SiC layer can take place using either photo anodization or RIE techniques. A Wheatstone bridge piezoresistor pattern can be formed in the doped layer 40, thus producing a pressure-sensing network. Metalized contacts are produced with the piezoresistor pattern. An underlying diaphragm, which is diaphragm 50 (6H or 4H SiC material) (FIG. 9) is shaped by selective etching to define the deflecting portion of the sensor. The formation of the deflecting area can be formed using either anodization or RIE based approaches for producing membranes of targeted thickness and dimensions.

A suitable etchant for SiC can be found in U.S. Pat. No. 6,034,001 entitled, "Method for Etching of SiC Semiconductor Using Selective Etching of Different Conductivity Types", which issued on Mar. 7, 2000 to A. D. Kurtz et al. and assigned to the assignee herein. That patent describes a method for selectively conductivity etching of a SiC semiconductor. Essentially, as one will understand, the wafer shown in FIG. 9 can easily be converted by treating the doped SiC into a pressure transducer. One would form the membrane by forming or etching the active area 50 shown in dashed lines in FIG. 9. One can then easily apply contacts and other structures to form a transducer device. The device produced using the above approach has the benefit of having an excellent single crystal 3C SiC on insulator, which is a silicon dioxide layer 31 with specified doping used for piezoresistor sensors. The device has an independently selected substrate material 30 as 6H—SiC or 4H—SiC used for producing the deflecting member 50 which forms a diaphragm structure for the piezoresistor sensors. A typical transducer structure, including contacts, can be shown by referring to U.S. Pat. No. 5,165,283 entitled, "High Temperature Transducers and Methods of Fabricating the Same Employing SiC" which issued on Nov. 4, 1992 to A. D. Kurtz et al. and is assigned to the assignee herein.

Figure 10:
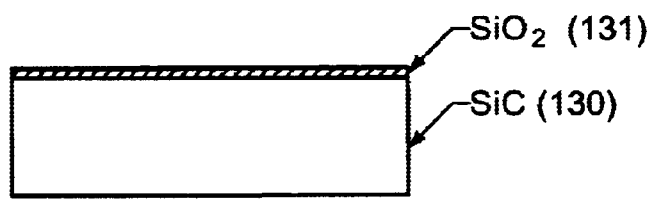
FIG. 10 shows a substrate wafer according to another embodiment of this method.
Figure 11:
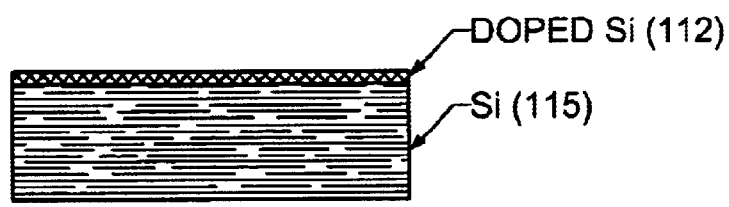
FIG. 11 shows a doped silicon wafer used as a pattern wafer.

Referring to FIGS. 10 through 14, it is understood to those skilled in the art, that in some cases the need for a thick oxide layer over the doped silicon layer may not be required and the entire process can then be simplified by eliminating the bonding and etchback of the sacrificial wafer. Thus, in this technique a SiC substrate wafer 130 is shown in FIG. 10 with a layer of silicon dioxide 131 formed on the surface of the SiC wafer 130. This substrate wafer basically is the same wafer as, for example, shown in FIG. 6. FIG. 11 now shows a doped silicon wafer 115 which, for example, is the same wafer as shown in FIG. 2, with a doped silicon layer 112. The doped silicon wafer is doped to a specified level necessary for conversion into a 3C—SiC layer of targeted resistivity, as for example, also specified in the description of the wafer shown in FIG. 2.

Figure 12:
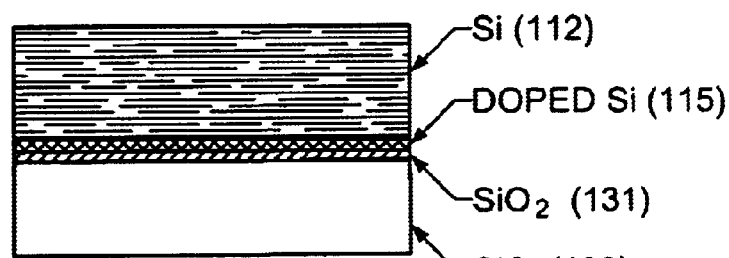
FIG. 12 shows the fusion bonded pattern wafer and the substrate wafer.
Figure 13:
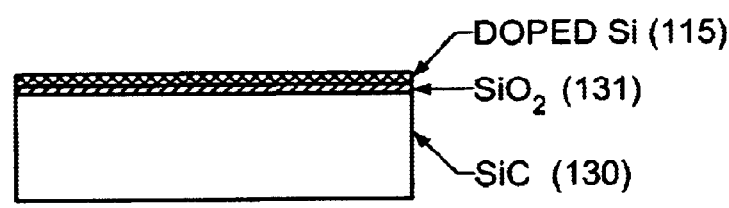
FIG. 13 shows the composite wafer with an undoped silicon layer removed.
Figure 14:
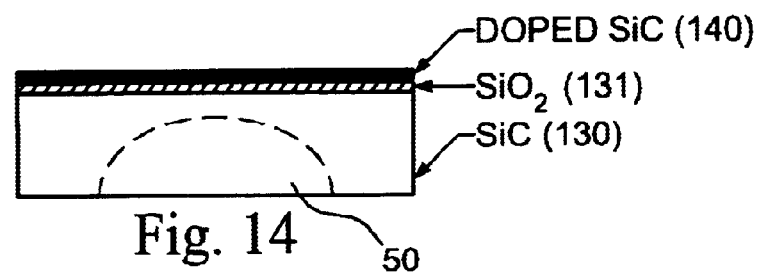
FIG. 14 shows a composite wafer with a doped silicon converted to doped SiC.

FIG. 12 shows that the substrate wafer is bonded directly to the doped silicon wafer by using fusion bonding to form the composite structure shown in FIG. 12, which essentially consists of the silicon wafer 112, the doped silicon layer 115 is fusion bonded to the silicon dioxide layer 131 associated with the SiC wafer 130. Once bonding takes place, a conductivity selective etch is utilized to remove the remainder of wafer 112, leaving the composite laminate structure shown in FIG. 13 with the undoped silicon layer removed and with the doped silicon layer 115 now bonded to the silicon dioxide layer 131 associated with the silicon wafer 130. This structure, for example, is the same structure as shown in FIG. 8. The remaining structure, which is shown in FIG. 14 is the same structure as, for example, shown in FIG. 9 which basically consists of the doped SiC layer 140, which is bonded to the silicon dioxide layer 131, which in turn is integrated with the SiC wafer 130. Thus, the structure now can be treated as described above to form a piezoresistive transducer as known in the art. The structure as shown in FIG. 14 consists of a doped layer 140 of 3C—SiC bonded to a layer of silicon dioxide 131, which is on a wafer of SiC 130. This is an extremely useful structure to fabricate a high temperature piezoresistive device. The structure as shown in FIG. 14 is useful for high temperature transducers and can be employed for other high temperature devices as minority carrier devices.

While the above-noted invention has been specifically described, it should be apparent to those skilled in the art that alternate embodiments may be discussed, all of which are deemed to be encompassed within the spirit and scope of the claims appended hereto.

What is claimed is:

1. A method for forming a composite silicon carbide structure suitable for use in fabricating high temperature semiconductor devices, comprising the steps of:
   a) providing a first substrate wafer of silicon carbide,
   b) forming a layer of silicon dioxide on a surface of said first substrate wafer,
   c) providing a second pattern wafer of silicon,
   d) doping a surface of said second wafer to enable conversion of said doped surface into a layer of silicon carbide of a targeted resistivity,
   e) bonding said first substrate wafer to said second pattern wafer with said layer of silicon dioxide of said first substrate contacting said doped surface of said second wafer wherein said bond is formed between said doped surface and said silicon dioxide layer,
   f) removing all of said silicon from said pattern wafer thus leaving said doped silicon layer bonded to said oxide layer secured to said silicon carbide wafer,
   g) converting said doped silicon surface to silicon carbide to provide a surface of silicon carbide capable of being processed into a semiconductor device, secured to a silicon dioxide layer secured to a silicon carbide wafer to create a high temperature composite structure.

2. The method according to claim 1 wherein said first substrate of silicon carbide is selected from 6H—SiC or 4H—SiC.

3. The method according to claim 1 wherein said converted silicon carbide is 3C—SiC.

4. The method according to claim 1 wherein said steps of removing silicon employs a conductivity selective etchant.

5. The method according to claim 1 wherein said surface of silicon carbide is processed to form piezoresistive sensors and said secured silicon carbide wafer is processed to provide a deflecting area.

6. The method according to claim 1 wherein said surface of silicon carbide is processed to form a minority carrier device such as a field effect transistor.

7. The method according to claim 1 wherein said composite device is a three-layer device having 3C—SiC first layer, a SiO2 second layer, and a SiC third layer.

8. The method according to claim 1 wherein the step of removing comprises removing most of said silicon from said pattern wafer while leaving a thin undoped layer of silicon on said doped silicon layer,
   oxidizing said thin undoped layer of silicon to form a layer of silicon dioxide,
   bonding said layer of silicon dioxide of said first wafer to said layer of silicon dioxide on said pattern wafer and then removing said silicon and said silicon dioxide.

9. The method according to claim 1 wherein the steps of bonding is fusion bonding.

10. A method for forming a semiconductor device comprising:
    a) providing a first wafer and a second wafer, both wafers fabricated from silicon,
    b) oxidizing said first wafer to form an oxidized sacrificial wafer having a surface of silicon dioxide,
    c) doping said second wafer, to form a pattern wafer having a surface of doped silicon,
    d) bonding said pattern wafer to said oxidized sacrificial wafer to form a composite by bonding said silicon dioxide surface of said first wafer to said doped surface of said second wafer,
    e) removing a portion of said undoped silicon of said second wafer to form a composite comprising undoped silicon having thereon a layer of doped silicon secured to a layer of silicon dioxide formed on a layer of silicon,
    f) substantially oxidizing said undoped silicon to form silicon dioxide,
    g) providing a substrate wafer of silicon carbide having a top layer of silicon dioxide,
    h) bonding said substrate wafer to said composite wafer by bonding said doped silicon layer to said silicon dioxide layer,
    i) substantially removing remaining undoped silicon from said composite; and,
    j) converting said doped silicon to crystalline silicon carbide.

11. The method of claim 10 wherein said crystalline doped silicon carbide comprises 3C—SiC.

12. The method according to claim 10 wherein said step of bonding comprises fusion bonding.

13. The method according to claim 10 wherein said silicon carbide substrate wafer is 6H or 4H SiC silicon carbide.

* * * * *